H. WILKENS.
PORTABLE WALK.
APPLICATION FILED NOV. 29, 1911.
1,050,584.
Patented Jan. 14, 1913.
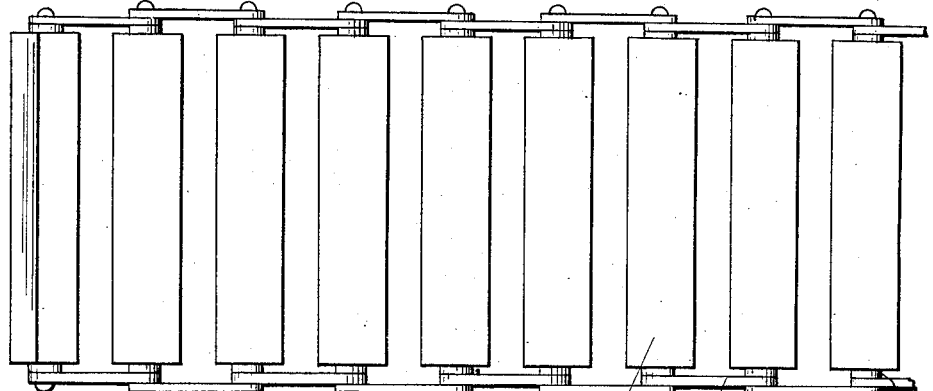
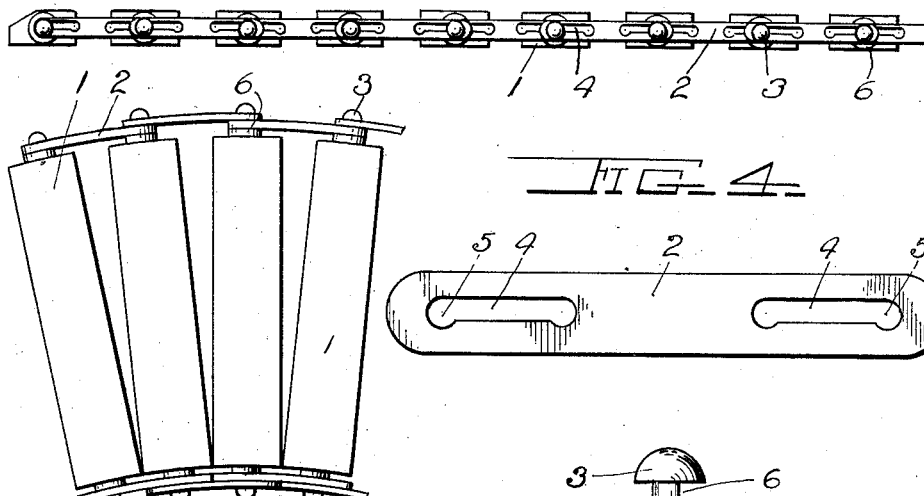
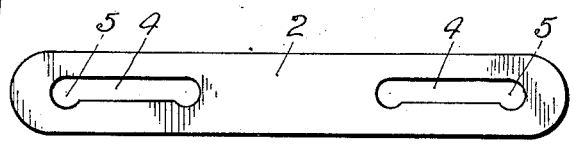
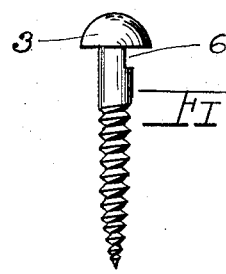
Inventor
HENRY WILKENS
By Victor J. Evans
Attorney
Witnesses

UNITED STATES PATENT OFFICE.

HENRY WILKENS, OF RACINE, WISCONSIN.

PORTABLE WALK.

1,050,584. Specification of Letters Patent. Patented Jan. 14, 1913.

Application filed November 29, 1911. Serial No. 662,980.

*To all whom it may concern:*

Be it known that I, HENRY WILKENS, a citizen of the United States, residing at Racine, in the county of Racine and State of Wisconsin, have invented new and useful Improvements in Portable Walks, of which the following is a specification.

This invention relates to portable walks.

The object of the invention is to provide a simple and efficient device of this character which may be folded into compact space for transportation or storage and which is flexible so as to permit the same to be arranged on curved walks which curve in either direction to be arranged on a walk wherein one portion thereof is higher than the other or to be used as a covering for steps in slippery weather.

Further objects of the invention will appear as the following specific description is read in connection with the accompanying drawing, which forms a part of this application, in which:—

Figure 1 is a top plan view. Fig. 2 is a similar view showing the walk arranged for a curved pavement or sidewalk. Fig. 3 is an edge elevation. Fig. 4 is a plan view of one of the links removed. Fig. 5 is a side elevation of one of the screws used which connect the links to the boards.

Referring more particularly to the drawing, 1 represents a plurality of boards having any suitable length, width, or thickness, which are connected together by links 2 and screws 3 passing through the links and projecting into the ends of the boards, as shown. These links are provided with slots 4 at each end for the passage of the screws and each slot is provided with an enlargement upon its under side at the end thereof, as shown at 5. This enlargement corresponds with the diameter of the screw 3, while the slot has a width from enlargement to enlargement, slightly less than the diameter of the screw. In order to permit adjustment of the link upon the screw, it is therefore necessary to form a recess 6 upon one side of the screw which reduces the diameter at this point to correspond with the width of the slot between the enlargements. When the parts are lying flat upon a surface, the base or bottom wall of the recess 6 in the screw will be arranged vertical and the screw will lie in the enlargement. In order to arrange the walk for a curved pavement, the boards are turned on edge and slid toward each other at one end and then turned out flat again with the screw in the opposite or inner enlargement of the slots. In order to prevent friction between the links and the boards, suitable washers are mounted upon the screws, as shown.

What is claimed is:—

In a portable walk, the combination with a plurality of boards, headed screws threaded in the ends of said boards, and having recessed shanks, a plurality of links, each having slots in opposite ends, whose width corresponds with the width of the screws at the recess, said slots having enlargements at opposite ends corresponding with the normal diameter of the shanks of the screws, and washers arranged between the links and the boards and surrounding the screws.

In testimony whereof I affix my signature in presence of two witnesses.

HENRY WILKENS.

Witnesses:
PETER NELSON,
AUGUST KRAUSE.

Copies of this patent may be obtained for five cents each, by addressing the "Commissioner of Patents, Washington, D. C."